June 9, 1942.  A. KOST  2,285,445
MOTOR VEHICLE STEERING STABILIZER
Filed Oct. 2, 1939  2 Sheets-Sheet 1
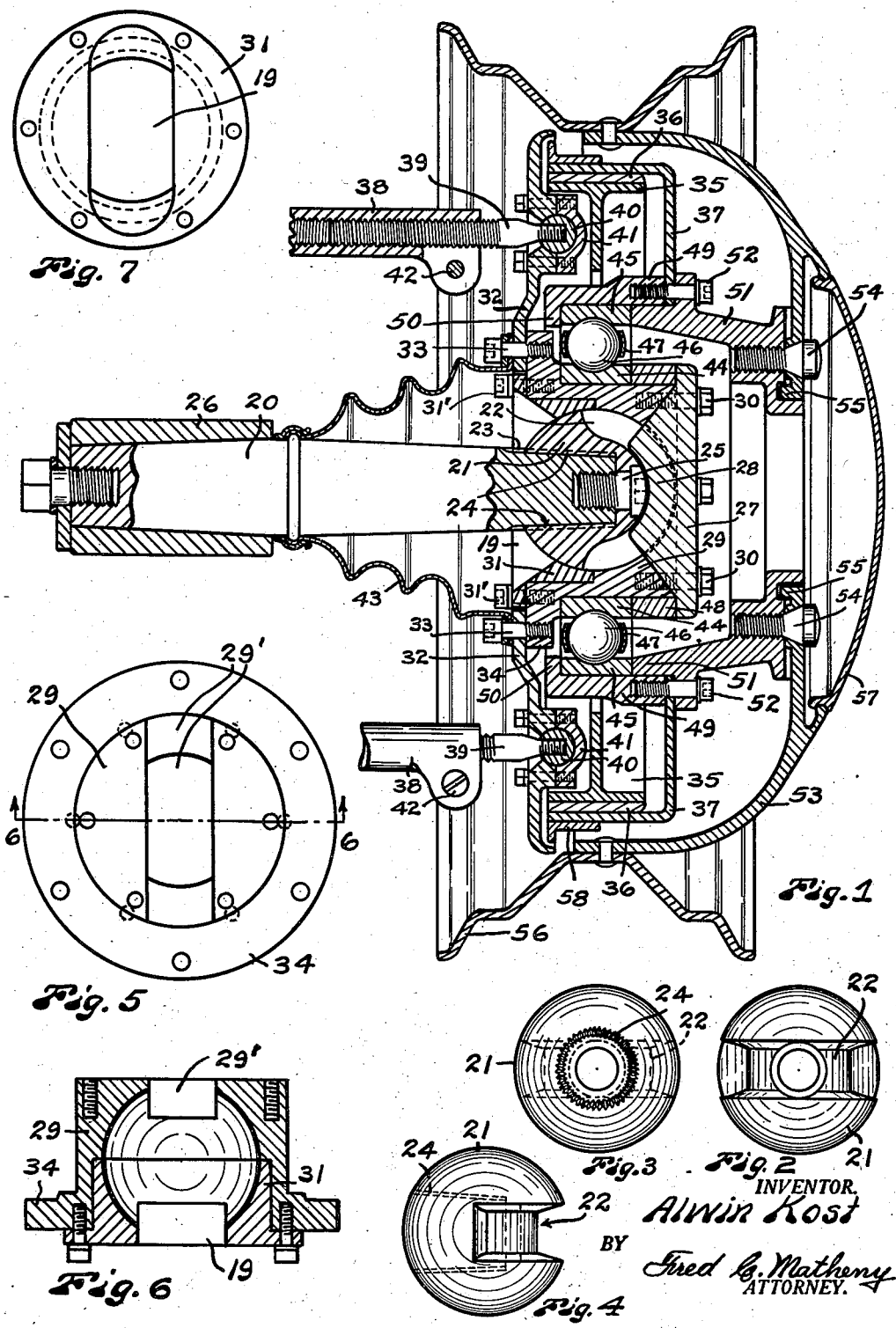
INVENTOR.
Alwin Kost
BY Fred G. Matheny
ATTORNEY.

June 9, 1942.  A. KOST  2,285,445
MOTOR VEHICLE STEERING STABILIZER
Filed Oct. 2, 1939   2 Sheets-Sheet 2

INVENTOR.
Alwin Kost
BY Fred C. Matheny
ATTORNEY.

Patented June 9, 1942

2,285,445

UNITED STATES PATENT OFFICE 2,285,445

MOTOR VEHICLE STEERING STABILIZER

Alwin Kost, Portland, Oreg., assignor to Kost Incorporated, Portland, Oreg., a corporation of Oregon Application October 2, 1939, Serial No. 297,447

3 Claims. (Cl. 280—96.3)

This invention relates to motor vehicle wheel mounting means.

An object of this invention is to provide a wheel mounting embodying means for controlling the angular position or tilt of a motor vehicle wheel in such a manner as to best withstand side thrust especially in the turning of the vehicle.

Another object is to provide a wheel mounting embodying means for automatically imparting a tilt to a wheel in a proper direction to resist side thrust whenever the wheel is angularly moved to steer the vehicle in a curved path, the tilt thus imparted being proportional to the acuteness of the turn being made.

When a moving vehicle is being turned on a roadway a portion of the momentum of said vehicle is exerted as a transverse thrust on the wheels of the vehicle. This sometimes results in damaged or broken wheels and may be the cause of accidents. Also it makes necessary slower speeds on curves. It is an object of this invention to provide a wheel mounting means by which the wheels of a vehicle will be angularly moved into positions best calculated to resist strains and thrusts due to turning of the vehicle and by which maximum stability on curves is obtained thereby minimizing lurching, swaying and skidding of the vehicle and providing greater safety and greater riding comfort.

It is a further object of this invention to provide wheel mounting means which will make possible higher speeds on curves and at the same time provide increased safety, a thing especially desirable in the operation of certain types of fire, police and military vehicles.

Other objects are to provide wheel mounting means which will reduce accidents, increase the life of wheels, axles, motors and other motor vehicle parts, provide better and easier steering, give better road adherence, and make possible faster speeds on curves with greater safety.

Other and more specific objects will be apparent from the following description taken in connection with the accompanying drawings.

In the accompanying drawings,

Fig. 1 is a view in axial section of a motor vehicle wheel mounting constructed in accordance with my invention, parts being shown in elevation and parts being broken away.

Fig. 2 is a detached elevation showing one end of a grooved ball embodied in the invention.

Fig. 3 is a detached elevation of the other end of said ball.

Fig. 4 is a detached side elevation of said ball.

Fig. 5 is a detached elevation of a ball receiving socket embodied in the invention showing the outer end of the same.

Fig. 6 is a sectional view of said ball receiving socket, taken on broken line 6—6 of Fig. 5, and showing an inner socket member attached thereto.

Fig. 7 is a detached elevation showing the inner side of an inner socket member.

Like reference numerals designate like parts throughout the several views.

Figures 8, 9:
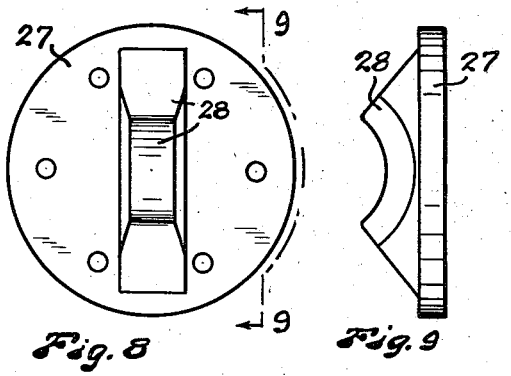
Fig. 8 is a detached inside elevation of a toothed cap member applicable to the socket shown in Figs. 5 and 6.
Fig. 9 is an elevation of said toothed cap member looking in the direction of broken line 9—9 of Fig. 8.

Referring to Figs. 1 to 10 inclusive I show motor vehicle steering device comprising a stub axle 20 having a ball 21 on the outer end thereof. The ball 21 is provided with a peripheral groove 22 in its outer portion. The groove 22 extends transversely of the axis of the stub axle 20 and when the mechanism is all assembled this groove is inclined as hereinafter explained.

The ball 21 and stub axle 20 may be of one piece construction but I preferably provide for relative angular adjustment therebetween by constructing the ball 21 separately and rigidly securing it to the end portion of the stub axle 20. One practical way of doing this is to taper the end portion of the axle and provide relatively fine longitudinally extending teeth or serrations 23 thereon and to further provide in the ball 21 a tapered socket having internal teeth or serrations 24, said socket being adapted to fit over and interlock with the tapered and externally toothed end portion of the stub axle 20. A cap screw 25 rigidly secures the ball 21 upon the end of the shaft. The taper of the interfitting toothed parts of the axle and ball insures a very tight fit when the cap screw 25 is tightened and the serrations prevent relative rotary movement of the axle 20 and ball 21. Adjustment is made by loosening the cap screw 25, withdrawing the ball 21 far enough for the teeth 23 and 24 to clear each other, turning the ball 21 to the desired angular position, and tightening the cap screw 25.

Angular adjustment of the ball 21 on the end of the axle adjusts the angle of the groove 22 and this provides for imparting a greater or less angle of inclination to the wheel in steering.

The stub axle 20 is rigidly and non-rotatively supported in a fixed axle housing 26 which is a part of the motor vehicle frame.

A cup or receptacle is provided for the ball 21. This cup or receptacle comprises a cap 27 having a tooth or key member 28 that fits into the groove 22, a tubular member 29 to which the cap 27 is secured by cap screws 30 and an inner cap member 31 rigidly secured by screws 31' to the tubular member 29.

The tubular member 29 and inner cap 31 are both cylindrically recessed and cooperate to fit the exterior of the ball 21 in such a manner that a limited amount of angular movement in a direction determined by movement of the tooth 28 in the groove 22 is permitted. Thus if the wheel is angularly moved to steer the vehicle the tooth 28 will compel a tilting movement at the same time.

The inner cap member 31 has a slot 19 extending substantially parallel to the groove 22 in the ball 21 and providing clearance for the stub axle 20. This slot 19 is shown in Figs. 1, 6 and 7. The tubular member 29 has a slot 29', see Figs. 5 and 7, through which the tooth member 28 extends as shown in Fig. 1.

A backing plate 32 overlaps the inner end portion of the tubular member 29 and is secured by cap screws 33 to a flange 34 on the inner end portion of said tubular member 29.

The backing plate 32 provides a support to which brake shoes 35 are secured. The securing and operating means for the brake shoes is of well known conventional type and is not herein shown and described. The brake shoes 35 carry brake linings 36 for engagement with suitable rotating brake drum 37.

One or more radius rods 38 are provided for steering purposes. These radius rods 38 have members 39 adjustably threaded into the ends thereof. The members 39 have balls 40 on their outer ends. The balls 40 fit within suitable sockets 41 in the backing plate 32. Clamp bolts 42 are provided to lock the members 39 in correct position. Two radius rods 38 are shown in Fig. 1, one to the front and the other to the rear of the axle 26. However one only of said radius rods, either in front of or to the rear of the axle 36 will provide satisfactory operation.

A dust guard 43 of pliable material, such as leather, is preferably provided around the stub axle 20 and exposed parts of the ball and socket means on the end portion of said axle.

Ball bearing means for the wheel is mounted on the tubular member 29. This ball bearing means comprises an inner race member 44, an outer race member 45 and balls 46 held by retainers 47 and operatively disposed between the race members 44 and 45.

The inner race member 44 is rigily secured on the tubular member 29 by clamping said inner race member between the base portion of the flange 34 and a retaining ring 48 that is held by the peripheral portion of the cap member 27. The outer race member 45 is secured to an annular ball bearing housing member 49, preferably by clamping it between a flange 50 of member 49 and the end of a hub member 51. Cap screws 52 rigidly secure parts 49 and 51 together and at the same time rigidly connect brake drum 37 with these parts. Obviously changes may be made in the form of the ball bearings shown in Fig. 1 and also in the corresponding bearings shown in Fig. 11.

A bowl shaped wheel rim support 53 is secured by wheel bolts 54 to the hub member 51. Hub member 51 and rim support 53 both have open central portions to afford access to cap member 27 and cap screws 30. Also rim support 53 has an inwardly directed flange 55 around its central opening which seats in a suitable annular recess in the hub member 51 to provide greater strength and rigidity and relieve the wheel bolts 54 of shearing strain.

The rim support 53 takes the place of the usual spokes or disc in a wheel. A rim 56 of any desired form is secured to the peripheral portion of the rim support. An ornamental hub cap 57 is releasably connected with the rim support.

A drum reinforcing ring 58 is provided on the exterior of the brake drum 37.

Preferably the medial plane of the wheel coincides with the medial plane of the ball 21.

The operation of the device disclosed in Figs. 1 to 10 is as follows: The several parts are set up and adjusted so that the groove 22 in the ball 21 will be at an angle to the horizontal corresponding to a desired amount of tilt to be imparted to the wheel 59. When the steering means is positioned for steering the vehicle straight ahead the wheel 59 will not be tilted in any direction, except for the desired toe-in and camber provided for in certain instances, and the parts 27, 29 and 31 that form the ball receptacle will be substantially coaxial with the stub axle 20.

The wheel 59 is pivotally supported for angular steering movement on the ball 21. When the wheel is angularly moved by operation of the radius rods 38 the tooth 28 on the cap member 27 will follow the groove 22 and tilt the wheel in the proper direction and the proper amount to best facilitate steering and to best withstand the load or thrust to which it is subjected.

The tooth 28 operating in the groove 22 thus serves to control the tilting of the front wheels in such a manner as to best stabilize the motor vehicle in turning, providing greater safety and making possible higher speeds on curves.

Figure 10:
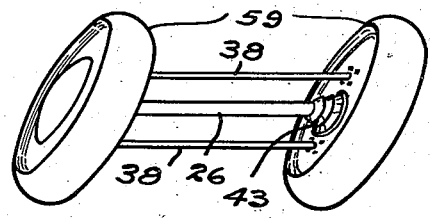
Fig. 10 is a somewhat diagrammatic plan view showing two motor vehicle wheels and illustrating a tilted position of said motor vehicle wheels.

For instance, when a right turn is being made the front wheels 59 of the vehicle will be angularly inclined to the right and angularly inclined relative to the vertical as shown in Fig. 10, the incline to the right being the usual incline in steering and the incline relative to the vertical being due to the movement of the tooth member 28 in the slot 22.

Figure 11:
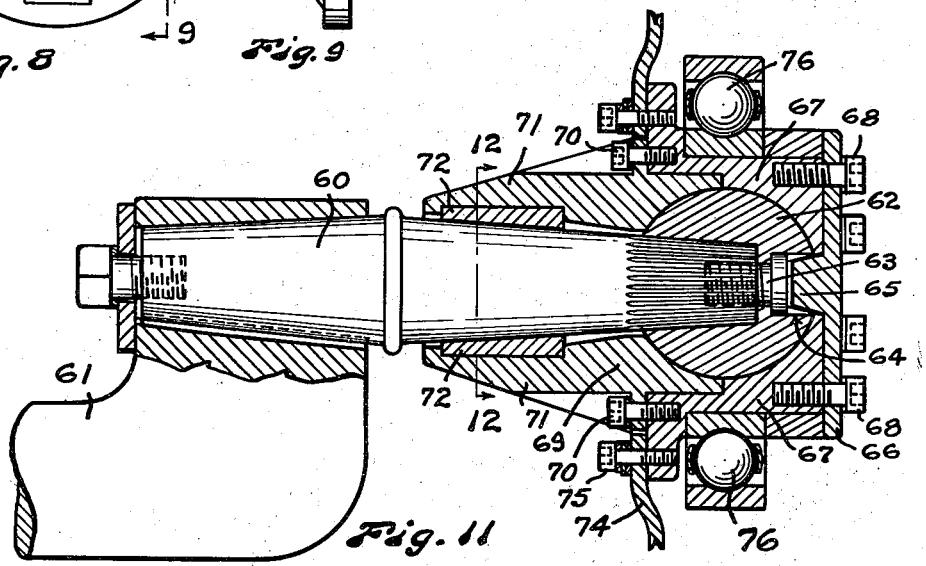
Fig. 11 is an axial sectional view, with parts in elevation, of an adaptation of the invention for use on trucks.

Fig. 11 shows a form of the invention adapted for use on heavy duty wheels. In this disclosure 60 is a stub axle secured to a main truck axle 61. A ball 62 is adjustably secured by a cap screw 63 to the outer end of the stub axle 60. Ball 62 has a peripheral groove 64 for the reception of a tooth 65 on a cap member 66. A tubular ball receiving member 67 is connected with cap 66 by screws 68.

Figure 12:
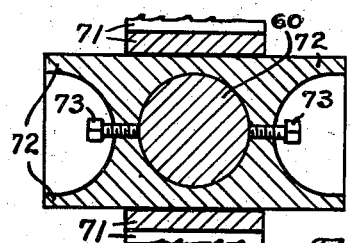
Fig. 12 is a sectional view substantially on broken line 12—12 of Fig. 11.

An inner cap member 69 extends into the ball receiving member 67 and fits against the ball 62. Cap screws 70 secure the inner cap member 69 to the member 67. Two spaced apart arms 71 on inner cap member 69 extend inwardly therefrom and engage with opposite sides of an arcuate support 72 that fits over and is adjustably secured to the stub axle 60, as by cap screws 73, Fig. 12.

The stub axle 60 extends through the arcuate support 72 and suitable means, such as cap screws 73 connects these two parts to prevent relative angular movement therebetween. The arms 71 slide on the support 72 and brace the structure against side thrust exerted against the bottom or top portion of the wheel. Obviously the arcuate supports 72 may be a part of the arms 71 if desired.

A backing plate 74 corresponding to the backing plate 32 is secured to the ball receiving member 67 by cap screws 75.

Suitable ball bearing means 76 for supporting a wheel, not shown, is provided on the member 67.

The foregoing description and accompanying drawings clearly disclose certain preferred embodiments of my invention but it will be understood that this disclosure is merely illustrative and that such changes may be made as are fairly within the scope and spirit of the following claims.

I claim:

1. A motor vehicle wheel mounting comprising an axle member non-rotatably supported; a ball member fixedly and adjustably secured to an end portion of said axle member whereby its angular position on said axle member may be adjusted; a groove extending across the outer end portion of said adjustable ball and normally inclined as respects both the vertical and horizontal; a non-rotatable wheel hub member mounted for angular movement on said ball; a tooth member rigid with said wheel hub operable in said groove controlling the direction of angular movement of said wheel hub member relative to said ball and adapted to impart to the wheel a banking incline relative to the vertical when said wheel is angularly moved on said ball for steering purposes; steering means connected with said wheel hub member to impart angular movement thereto; and a wheel rotatably mounted on said wheel hub member.

2. A motor vehicle wheel mounting comprising an axle member having a ball on an end portion thereof; a non-rotatable wheel hub means pivoted for angular movement on said ball; a wheel rotatable on said wheel hub means, a groove extending across the outer end portion of said ball in a position inclined relative to the horizontal, the bottom wall of said groove being convex and the side walls of said groove being inclined divergently from the bottom outward, and a relatively long tooth member rigid with said hub means interfitting within said groove and movable therein, said tooth member having a concave inner surface mating with the convex bottom of said groove and having inclined side walls mating with the inclined side walls of said groove, said groove and said tooth cooperating to impart to the wheel a banking incline relative to the vertical when said wheel is angularly moved on said ball for steering purposes.

3. A motor vehicle wheel mounting comprising an axle member having a ball on an end portion thereof; non-rotatable wheel hub means pivoted for angular movement on said ball; a wheel rotatably mounted on said hub means; a groove extending across the outer end portion and around the sides of said ball throughout more than one half of the circumferential distance around said ball, said groove being inclined relative to the horizontal; and a relatively long tooth member rigid with said hub means and fitting snugly within said groove, the length of said tooth member being substantially greater than the width thereof whereby said tooth member will move longitudinally within said groove without binding and impart to the wheel a banking movement relative to the vertical as it moves within said groove.

ALWIN KOST.